US012746861B2

(12) United States Patent
Kaneko et al.

(10) Patent No.: US 12,746,861 B2
(45) Date of Patent: Sep. 29, 2026

(54) VEHICLE SEAT

(71) Applicant: TOYOTA JIDOSHA KABUSHIKI KAISHA, Aichi-ken (JP)

(72) Inventors: Akira Kaneko, Toyota (JP); Daishi Takata, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 19/289,104

(22) Filed: Aug. 4, 2025

(65) Prior Publication Data

US 2026/0054624 A1 Feb. 26, 2026

(30) Foreign Application Priority Data

Aug. 21, 2024 (JP) ................................ 2024-139638

(51) Int. Cl.
*B60N 2/62* (2006.01)
*B60N 2/02* (2006.01)
*B60N 2/20* (2006.01)
*B60N 2/66* (2006.01)

(52) U.S. Cl.
CPC ............. *B60N 2/66* (2013.01); *B60N 2/0244* (2013.01); *B60N 2/20* (2013.01)

(58) Field of Classification Search
USPC ........................................................... 701/49
See application file for complete search history.

(56) References Cited

U.S. PATENT DOCUMENTS

| | | | | |
|---|---|---|---|---|
| 6,666,292 | B2 * | 12/2003 | Takagi | B60R 21/01516 180/274 |
| 7,874,618 | B2 * | 1/2011 | Kohl | B60N 2/643 297/284.4 |
| 9,187,012 | B2 * | 11/2015 | Sachs | B60N 2/181 |
| 9,327,625 | B2 * | 5/2016 | Sakata | B60N 2/0244 |
| 9,604,553 | B2 * | 3/2017 | Jaranson | B60N 2/2227 |
| 9,809,131 | B2 * | 11/2017 | Line | B60N 2/02246 |
| 9,889,771 | B2 * | 2/2018 | Ohno | B60R 21/207 |
| 10,011,202 | B2 * | 7/2018 | Kajino | B60N 2/933 |
| 10,493,882 | B1 * | 12/2019 | Romelfanger | B60N 2/2222 |
| 11,304,528 | B2 * | 4/2022 | Battey | A47C 3/20 |
| 12,240,405 | B2 * | 3/2025 | Jaradi | B60N 2/0272 |
| 2010/0259081 | A1 * | 10/2010 | Kuno | B60N 2/2209 297/284.4 |
| 2010/0301650 | A1 * | 12/2010 | Hong | B60N 2/666 297/284.8 |
| 2012/0161486 | A1 * | 6/2012 | Stojanovic | B60N 2/26 297/354.1 |
| 2016/0288752 | A1 * | 10/2016 | Stancato | B60N 2/62 |
| 2016/0347222 | A1 * | 12/2016 | Uno | B60N 2/90 |
| 2017/0008480 | A1 * | 1/2017 | Ohno | B60N 2/99 |
| 2017/0101042 | A1 * | 4/2017 | Zouzal | B60N 2/0022 |

(Continued)

FOREIGN PATENT DOCUMENTS

| | | | |
|---|---|---|---|
| JP | 2006-160217 | A | 6/2006 |
| JP | 2010-246599 | A | 11/2010 |
| JP | 2023-004166 | A | 1/2023 |

*Primary Examiner* — Jonathan M Dager
(74) *Attorney, Agent, or Firm* — HAUPTMAN HAM, LLP

(57) ABSTRACT

A vehicle seat including a seat cushion, a seat back, a reclining mechanism, a lumbar support mechanism, and a control unit, wherein the control unit pushes out a support surface toward an occupant by the lumbar support mechanism when the seat back tilts rearward by a predetermined angle or more.

6 Claims, 5 Drawing Sheets

(56) References Cited

U.S. PATENT DOCUMENTS

| | | | | |
|---|---|---|---|---|
| 2018/0257534 | A1* | 9/2018 | Mizoi | B60N 2/64 |
| 2019/0152349 | A1* | 5/2019 | Perkins | B60K 26/02 |
| 2020/0108747 | A1* | 4/2020 | Sekizuka | B60N 2/42718 |
| 2020/0108749 | A1* | 4/2020 | Nagai | B60N 2/6671 |
| 2025/0001959 | A1* | 1/2025 | Mankame | B60R 16/037 |
| 2025/0178495 | A1* | 6/2025 | Tomioka | B60N 2/289 |
| 2026/0138503 | A1* | 5/2026 | Takahira | B60N 2/0276 |

* cited by examiner

VEHICLE SEAT

CROSS REFERENCE TO RELATED APPLICATION

This application claims priority to Japanese Patent Application No. 2024-139638 filed on Aug. 21, 2024, which is incorporated herein by reference in its entirety including the specification, claims, drawings, and abstract.

TECHNICAL FIELD

The present disclosure relates to a structure of a vehicle seat including a reclining mechanism.

BACKGROUND

There has been used a vehicle seat that suppresses positional displacement of a head of an occupant with respect to a headrest and roll-up of clothes of the occupant when a seat back is tilted rearward.

For example, JP2006-160217A discloses a vehicle seat including a coupling link that rotatably couples a lower portion of a seat back and a rear end portion of a seat cushion, and a parallel link that couples the seat cushion and a floor. In this vehicle seat, when the seat back is tilted rearward, the rear end portion of the seat cushion is displaced upward and rearward.

Further, JP2010-246599A discloses a vehicle seat in which a seat back and a seat cushion are connected by a link mechanism including an L-shaped link. In this vehicle seat, when the seat back is tilted rearward, the seat cushion moves upward and forward.

Further, JP2023-004166A discloses a vehicle seat having a top plate driving portion for relaxing a step between a top plate portion and a seat back, wherein the top plate portion supporting a buttock portion of a seated person of a seat cushion moves forward and upward when the seat back tilts backward.

SUMMARY

In the vehicle seat of the related art described in JP2006-160217A and the like, the rotation center of the back of the occupant can be brought close to the rotation center of the seat back. However, in this vehicle seat, since the rotation center of the seat back is away from the boundary position between the seat back and the seat cushion, the lower end of the seat back becomes lower than the rear end of the seat cushion when the seat back is tilted rearward. Therefore, a step is generated between the rear end of the seat cushion and the lower end of the seat back. As a result, the occupant may feel uncomfortable due to the step, abdominal compression due to the rear of the buttocks falling into the step, or fatigue or discomfort due to uneven pressure distribution in the back.

Therefore, an object of the present disclosure is to suppress uncomfortable feeling of an occupant when the seat back is tilted rearward.

A vehicle seat according to an embodiment of the present disclosure includes a seat cushion frame, a seat back, a seat back frame, a reclining mechanism, a lumbar support mechanism, and a control unit. The seat cushion frame supports the seat cushion. The seat back includes a support surface that supports a back of a seated occupant. The seat back frame supports the seat back. The reclining mechanism includes a bracket having a curved shape integrally provided with the seat back frame, and the bracket moves in an arc shape with respect to the seat cushion frame to tilt the seat back rearward. The lumbar support mechanism pushes the support surface toward the occupant. The controller adjusts the operation of the lumbar support mechanism. The control unit includes a processor that performs information processing, and the processor is configured to push the support surface toward the occupant by the lumbar support mechanism when the seat back tilts rearward by a predetermined angle or more.

As a result, when the seat back is tilted rearward, the lumbar support mechanism reduces a step generated between the rear end portion of the seat cushion and the lower end portion of the seat back, so that the occupant's discomfort can be suppressed.

In the vehicle seat according to the present disclosure, the processor may adjust the pushed position of the support surface based on an inclination angle of the seat back.

The step generated between the rear end portion of the seat cushion and the lower end portion of the seat back varies depending on the inclination angle of the seat back. Therefore, by adjusting the pushed position of the support surface based on the inclination angle of the seat back, it is possible to suppress the uncomfortable feeling of the occupant regardless of the inclination angle of the seat back.

In the vehicle seat according to the present disclosure, the reclining mechanism may include a curved rail attached to the seat cushion frame, and the bracket may swing with respect to the seat cushion frame by moving while being guided by the curved rail.

Accordingly, the reclining mechanism can be disposed at a position away from the rotation center while setting the rotation center at a position close to the hip point of the occupant. Accordingly, it is possible to suppress the occupant sitting on the vehicle seat from coming into contact with the reclining mechanism.

In the vehicle seat of the present disclosure, the curved rail may have a curved shape in which a radius of curvature changes.

Thus, a plurality of rotation centers of the seat back can be set, and the reclining operation can be performed with a high degree of freedom.

According to the present disclosure, it is possible to suppress the uncomfortable feeling of the occupant when the seat back is tilted rearward.

DESCRIPTION OF EMBODIMENTS

Figure 1:
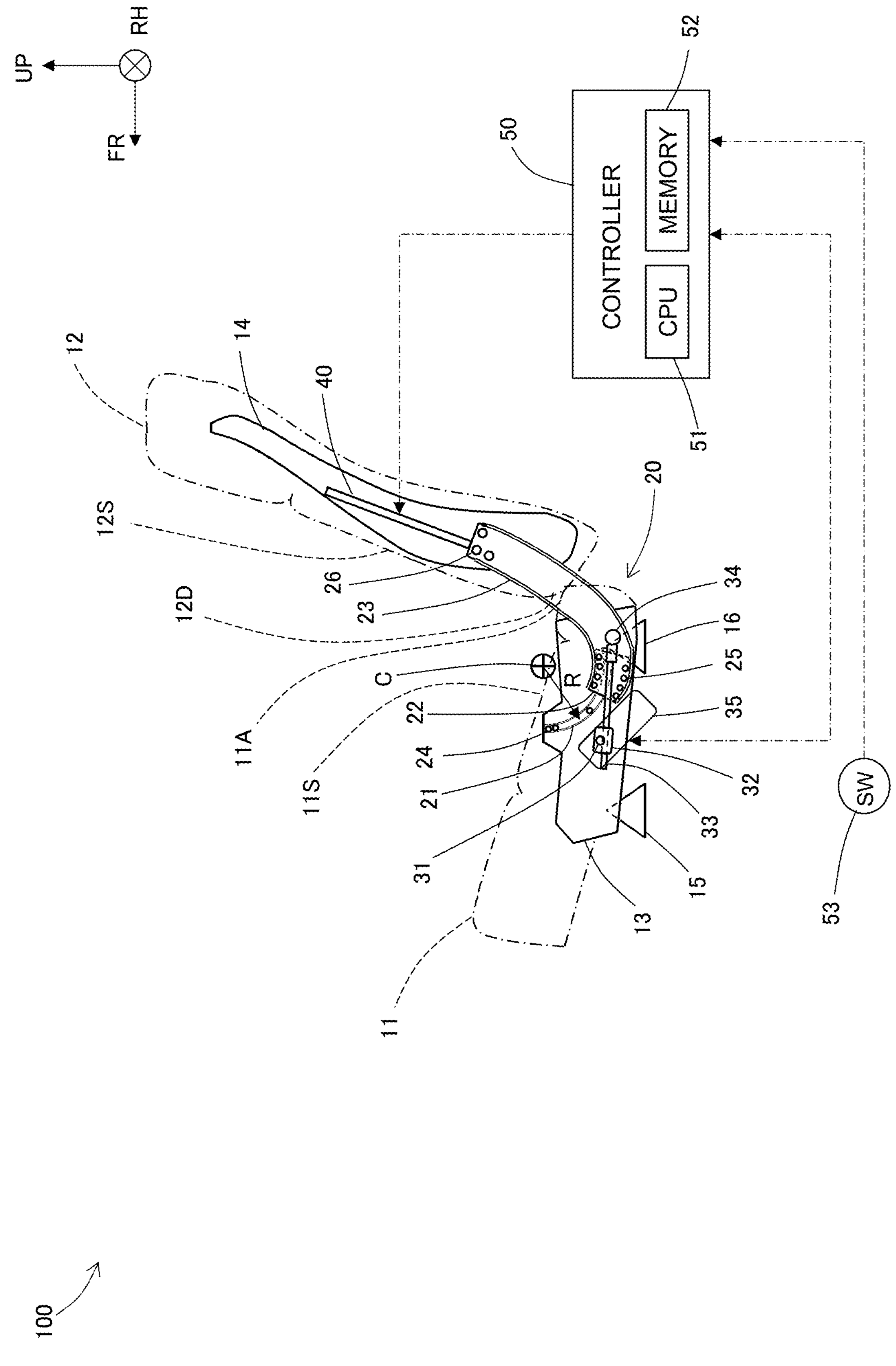
FIG. 1 is a system diagram illustrating a structure of a vehicle seat according to an embodiment.

Hereinafter, a vehicle seat 100 according to an embodiment will be described with reference to the drawings. Note that FR, UP, and RH shown in the drawings indicate a front side, an upper side, and a right side of the vehicle seat 100, respectively. The opposite directions of FR, UP, and RH indicate the rear side, the lower side, and the left side, respectively. Hereinafter, in the case where the front-rear direction, the left-right direction, and the up-down direction are simply used, the front-rear direction, the left-right direction, and the up-down direction of the vehicle seat 100 are indicated unless otherwise specified.

As shown in FIG. 1, the vehicle seat 100 includes a seat cushion 11, a seat back 12, a seat cushion frame 13, a seat back frame 14, a reclining mechanism 20, a lumbar support mechanism 40, and a control unit 50.

The seat cushion frame 13 is a metal plate-shaped member that is disposed at the left and right end portions of the vehicle seat 100 and extends in the front-rear direction. The left and right seat cushion frames 13 are connected to the left and right by a plurality of cross members (not shown), and are attached to a floor (not shown) of the vehicle body by front and rear leg portions 15 and 16. The seat cushion 11 is mounted on the left and right seat cushion frames 13. The seat cushion 11 includes a seat surface 11S that supports the buttocks 61 (see FIG. 2) of the seated occupant 60.

The seat back frame 14 is a metal plate-like member that is disposed on the upper rear side of the left and right seat cushion frames 13 and extends in the vertical direction. The left and right seat back frames 14 are connected to each other in the left-right direction by connecting members (not shown). The left and right seat back frames 14 are connected to the left and right seat cushion frames 13 by a reclining mechanism 20. A seat back 12 is attached to the front of the left and right seat back frames 14. The seat back 12 includes a support surface 12S that supports the back 62 (see FIG. 2) of the seated occupant 60.

The reclining mechanism 20 includes a curved rail 21, a slider 22, a bracket 23, a rod 31, a worm gear case 32, a screw 33, and a motor 35. The reclining mechanism 20 tilts the seat back 12 rearward about the rotation center C. Here, the rotation center C is a position away from the reclining mechanism 20 and close to a hip point 65 (see FIG. 4) which is a center of rotation of the upper body of the occupant 60 when the seat back 12 tilts backward.

The curved rail 21 is an arc-shaped rail having a radius R and attached to the side surface of the seat cushion frame 13 by a bolt 24. The slider 22 is movable along the curved rail 21 while being guided by the curved rail 21. The bracket 23 is a curved plate-shaped member having a lower portion curved in an arc shape and an upper portion extending upward. An upper portion of the bracket 23 is fixed to a side surface of a lower portion of the seat back frame 14 by a bolt 26. Thus, the bracket 23 and the seat back frame 14 are integrated with each other. The lower portion of the bracket 23 is fixed to the slider 22 by bolts 25. Therefore, when the slider 22 is guided by the curved rail 21 and moves in an arc shape, the lower portion of the bracket 23 rotationally moves with respect to the seat cushion frame 13, and the seat back frame 14 rotates about the rotation center C. As a result, the seat back 12 tilts rearward. Here, the rotation center C is a curvature center of the curved rail 21.

The rod 31 is a round bar member that is supported by the left and right seat cushion frames 13 and extends in the left-right direction. The left and right end portions of the rod 31 extend to the outside of the left and right seat cushion frames 13 through the left and right seat cushion frames 13. The worm gear case 32 houses a worm gear connected to both ends of the rod 31 and a screw 33. The worm gear engages with the screw 33 in the worm gear case 32. The worm gear case 32 is attached to the outside of the seat cushion frame 13 so as to be rotatable around the rod 31. The rear end of the screw 33 is rotatably connected to the lower portion of the bracket 23 by a fastening portion 34. The motor 35 is disposed between the left and right seat cushion frames 13, and rotationally drives the rod 31. The motor 35 detects and outputs the rotational angle position of the rod 31.

The lumbar support mechanism 40 is disposed inside the seat back 12, and pushes the support surface 12S of the seat back 12 toward the occupant 60 in the seat front direction.

The control unit 50 is a computer including a CPU 51 that is a processor that performs information processing therein, and a memory 52 that stores programs and control data. The control unit 50 is connected to the motor 35, the lumbar support mechanism 40, and the reclining switch 53. The rotation angle of the rod 31 detected by the motor 35 and an operation signal of the reclining switch 53 are input to the control unit 50. The control unit 50 adjusts the operation of the motor 35 and the lumbar support mechanism 40 based on the input signal.

Figure 2:
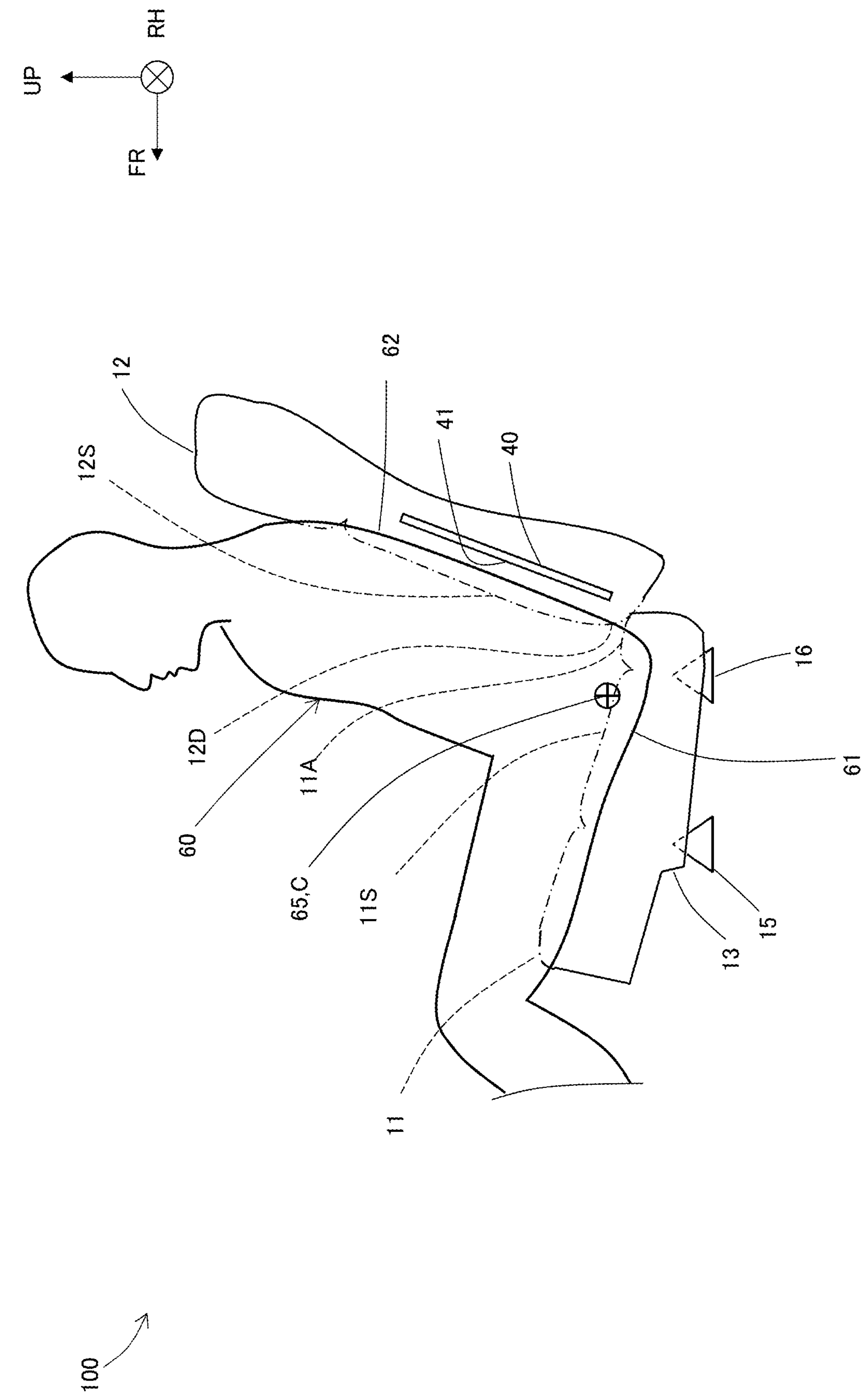
FIG. 2 is an elevational view showing a state in which an occupant sits on the vehicle seat shown in FIG. 1.

As shown in FIG. 2, when the seat back 12 is in the upright state, the back 62 of the occupant 60 and the front surface 41 of the lumbar support mechanism 40 are substantially parallel to each other. The sinking amount of the support surface 12S of the seat back 12 is substantially constant along the surface of the back 62, and the pressure applied from the support surface 12S to the back 62 is also substantially constant. This state is a comfortable state for the occupant 60.

Next, an operation when the seat back 12 of the vehicle seat 100 shown in FIGS. 1 and 2 tilts rearward will be described with reference to FIGS. 3 and 4. The operation of the CPU 51 of the control unit 50 is realized by the CPU 51 executing a program stored in the memory 52.

When the occupant 60 operates the reclining switch 53 and an operation signal of the reclining switch 53 is input to the control unit 50, the CPU 51 operates the motor 35 of the reclining mechanism 20.

Figure 3:
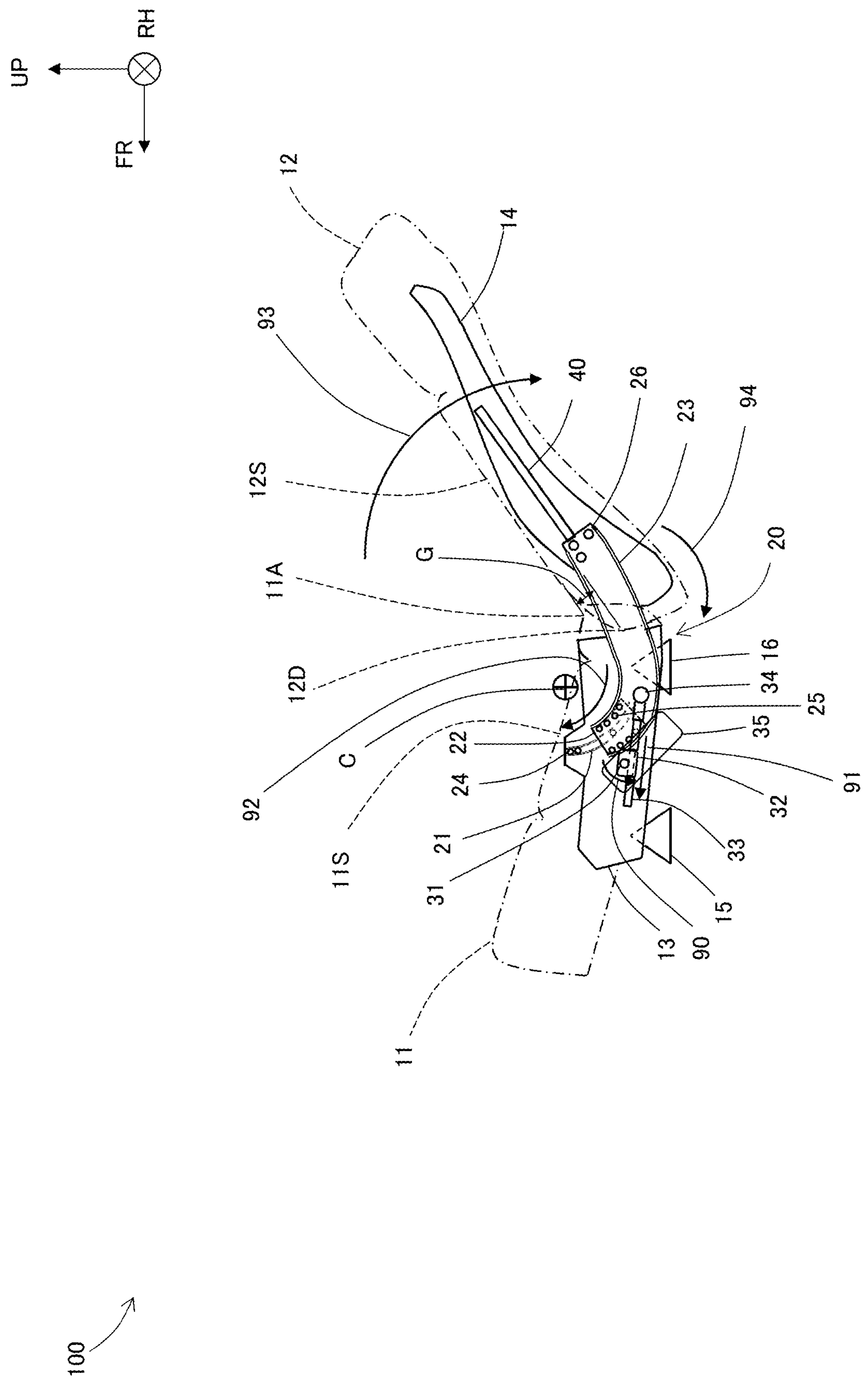
FIG. 3 is an explanatory view showing an operation of each part when a seat back of the vehicle seat shown in FIG. 1 is tilted rearward.

When the motor 35 rotates the rod 31, the worm gears connected to both ends of the rod 31 rotate as indicated by arrows 90 in FIG. 3. As a result, as indicated by an arrow 91 in FIG. 3, the screw 33 engaged with the worm gear moves forward with respect to the seat cushion frame 13. Accordingly, the fastening portion 34 at the rear end of the screw 33 moves forward. When the fastening portion 34 moves forward, the slider 22 moves in an arc along the curved rail 21 as indicated by an arrow 92 in FIG. 3. As a result, as indicated by an arrow 93 in FIG. 3, the seat back 12 rotates about the rotation center C and tilts rearward.

As indicated by an arrow 94 in FIG. 3, when the seat back 12 tilts rearward, the lower end portion 12D of the seat back 12 rotates so as to enter the rear of the rear end portion 11A of the seat cushion 11. Therefore, when the seat back 12 tilts rearward, the lower end portion 12D of the seat back 12 becomes lower than the rear end portion 11A of the seat cushion 11, and a step G is generated between the lower end portion 12D and the rear end portion 11A.

When the seat back 12 starts to tilt rearward, the CPU 51 calculates the tilt angle of the seat back 12 based on the rotation angle position of the rod 31 input from the motor 35. When the inclination angle of the seat back 12 becomes equal to or larger than the predetermined angle, the CPU 51 operates the lumbar support mechanism 40 as shown in FIG. 4. Here, the predetermined angle can be freely set, but may be, for example, between 30° and 60°. As a result, as indicated by an outlined arrow 98 in FIG. 4, the front surface

41 is pushed forward toward the occupant 60, and the support surface 12S of the seat back 12 is pushed toward the occupant 60. In FIG. 4, hatching indicates a state in which the front surface 41 of the lumbar support mechanism 40 has moved forward. As a result, the step G (see FIG. 5) between the lower end portion 12D of the seat back 12 and the rear end portion 11A of the seat cushion 11 is reduced to the step H (see FIG. 4). Therefore, it is possible to suppress the rear of the buttocks 61 of the occupant 60 from entering the step G, and it is possible to suppress the occupant 60 from feeling a sense of compression of the abdomen.

Figure 4:
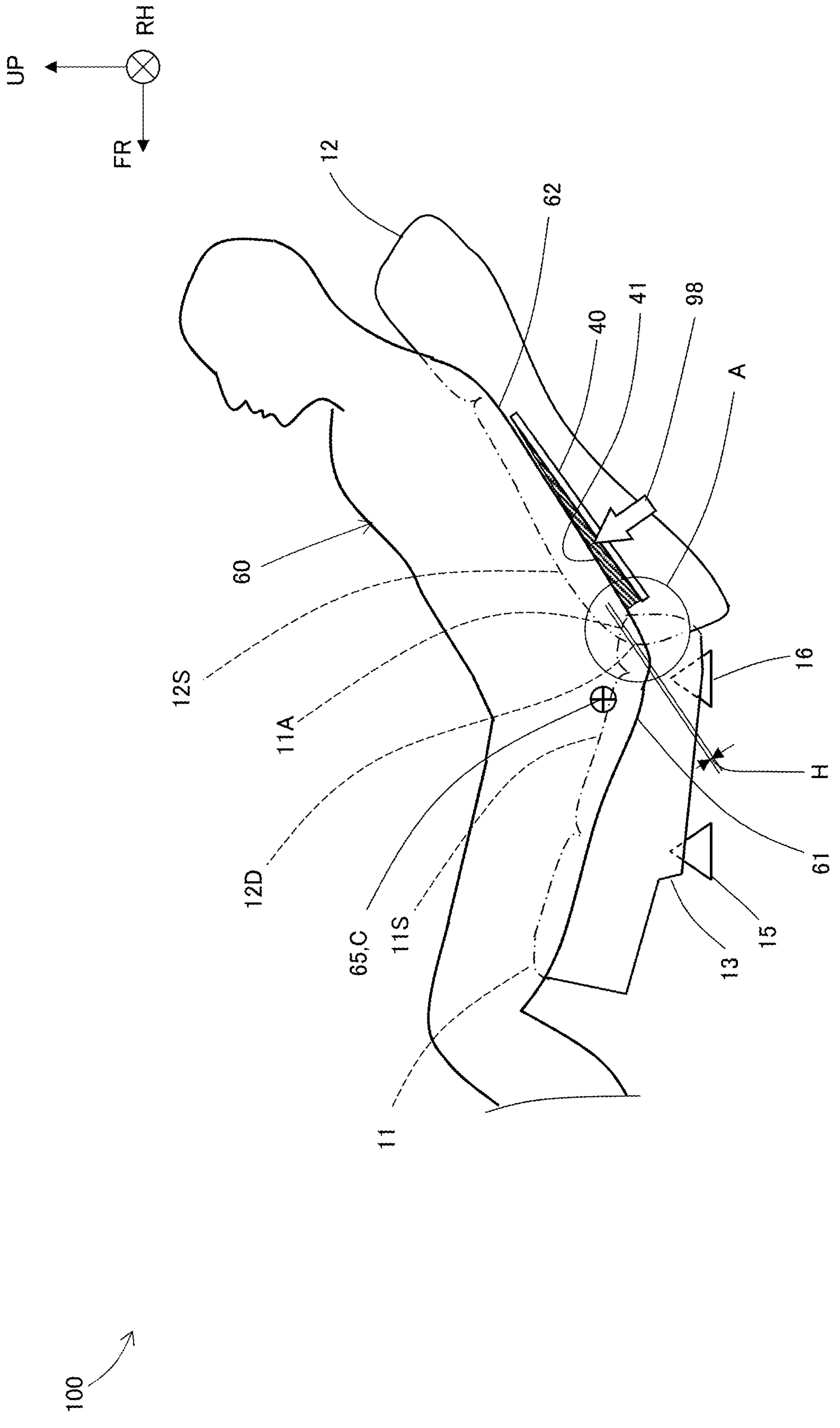
FIG. 4 is an elevational view showing a state in which a seat back is tilted backward in a state in which an occupant sits on the vehicle seat shown in FIG. 1.

In addition, since the front surface 41 is pushed forward toward the occupant 60 by the operation of the lumbar support mechanism 40, the back 62 of the occupant 60 of the seat back 12 and the front surface 41 are substantially parallel to each other as shown in a portion A in FIG. 4. Therefore, as in the case where the seat back 12 stands, the amount of sinking of the support surface 12S of the seat back 12 is substantially constant along the surface of the back 62, the pressure applied from the support surface 12S to the back 62 is also substantially constant, and the state is comfortable for the occupant 60. As a result, the occupant 60 can be prevented from feeling fatigue or discomfort due to the uneven pressure distribution of the back 62.

Next, a case where the seat back 12 is tilted backward in a state where the occupant 60 sits on the vehicle seat 110 of the comparative example (prior art) will be described with reference to FIG. 5. Here, in the vehicle seat 110 of the comparative example (prior art), the control unit 50 does not operate the lumbar support mechanism 40 even when the seat back 12 tilts rearward. The other configuration is the same as that of the vehicle seat 100.

Figure 5:
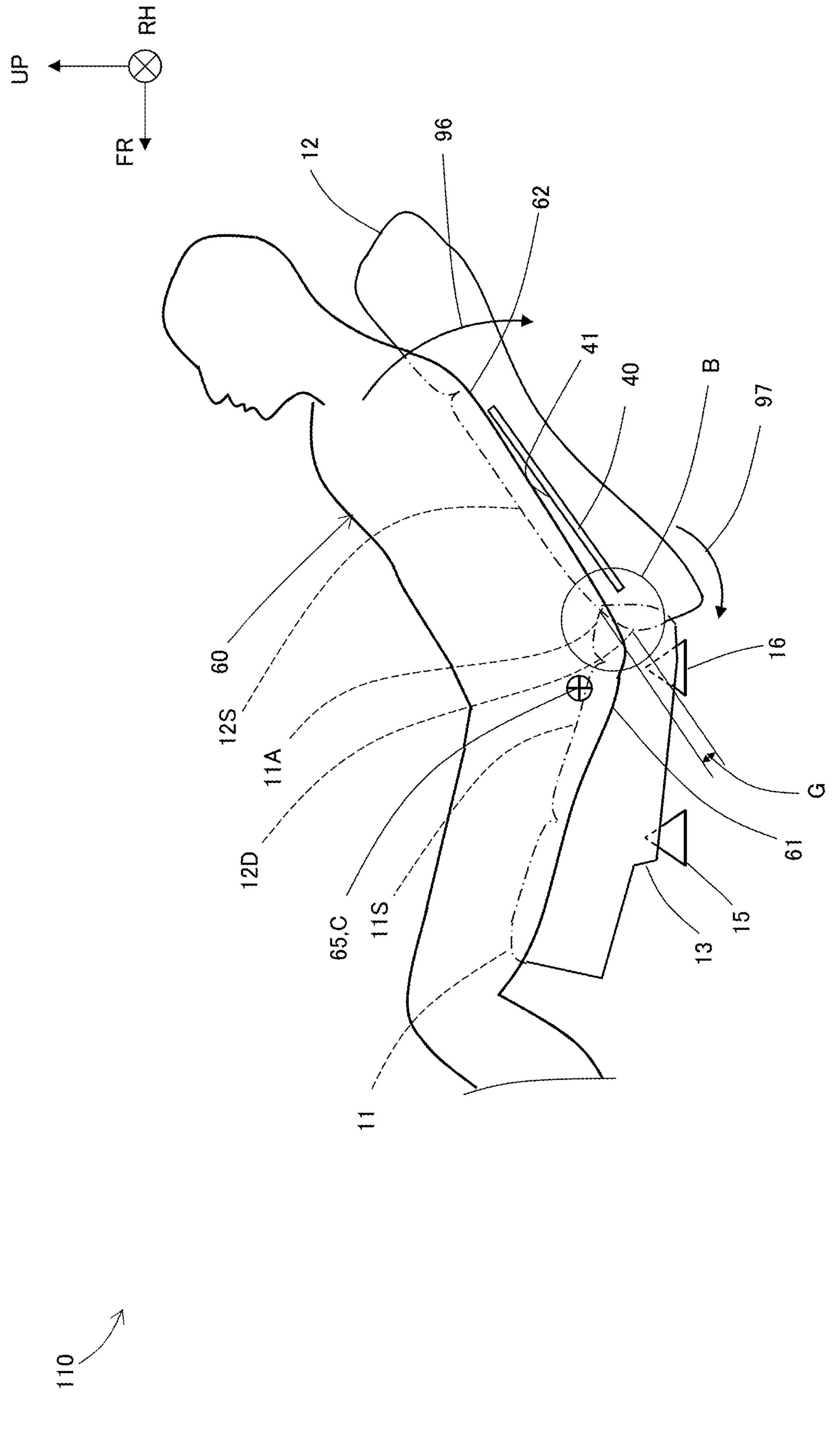
Prior Art FIG. 5
FIG. 5 is an elevational view showing a state in which the seat back is tilted backward in a state in which the occupant sits on the vehicle seat of the comparative example (prior art).

As shown in FIG. 5, in the vehicle seat 110, when the occupant 60 operates the reclining switch 53 and the seat back 12 tilts rearward, as described above with reference to FIG. 4, the lower end portion 12D of the seat back 12 becomes lower than the rear end portion 11A of the seat cushion 11, and a step G is generated between the lower end portion 12D and the rear end portion 11A (see a portion B of FIG. 5). Therefore, the occupant 60 may feel a feeling of compression due to bending of the abdomen due to the rear side of the buttocks 61 entering the step G. Further, the back 62 of the occupant 60 and the front surface 41 of the lumbar support mechanism 40 are not substantially parallel to each other, and the sinking amount of the support surface 12S of the seat back 12 is not substantially constant along the surface of the back 62. Therefore, the occupant 60 may feel fatigue or discomfort due to the uneven pressure distribution of the back 62.

On the other hand, in the vehicle seat 100 of the embodiment, when the inclination angle of the seat back 12 becomes equal to or larger than the predetermined angle, the support surface 12S is pushed out to the seat front side by the lumbar support mechanism 40, so that the step G (see FIG. 5) generated between the lower end portion 12D of the seat back 12 and the rear end portion 11A of the seat cushion 11 is reduced to the step H (see FIG. 4), and the uncomfortable feeling as described above of the occupant 60 can be suppressed.

Further, in the vehicle seat 100, the reclining mechanism 20 can be disposed at a position away from the rotation center C while the rotation center C is disposed at a position close to the hip point 65 of the occupant 60. Accordingly, it is possible to suppress the occupant 60 seated on the vehicle seat 100 from coming into contact with the reclining mechanism 20.

In the above description, the CPU 51 of the control unit 50 pushes the support surface 12S toward the seat front toward the occupant 60 by the lumbar support mechanism 40 when the inclination angle of the seat back 12 becomes equal to or larger than the predetermined angle. However, the operation of the CPU 51 of the control unit 50 is not limited to this. The CPU 51 of the control unit 50 may adjust the rearward position of the support surface 12S in accordance with the inclination angle of the seat back 12. For example, as the inclination angle of the seat back 12 increases, the pushing amount of the support surface 12S toward the seat front side may be increased.

The step G generated between the lower end portion 12D of the seat back 12 and the rear end portion 11A of the seat cushion 11 changes depending on the inclination angle of the seat back 12. Therefore, by adjusting the extrusion position of the support surface 12S in accordance with the inclination angle of the seat back 12, it is possible to suppress the uncomfortable feeling of the occupant 60 regardless of the inclination angle of the seat back 12.

In the above description, the curved rail 21 is an arc-shaped rail, but the shape of the curved rail 21 is not limited thereto. For example, the curved rail 21 may have a curved shape having a plurality of radii of curvature. In this case, the curved rail 21 has a plurality of centers of curvature, and a plurality of rotation centers C of the seat back 12 can be set. Accordingly, it is possible to perform the reclining operation with a high degree of freedom.

In the above description, the bracket 23 is fixed to the seat back frame 14 by the bolt 26, but the bracket 23 is not limited to this configuration as long as it is integrally provided with the seat back frame 14. For example, a seat back frame assembly in which the seat back frame 14 and the bracket 23 are integrally molded may be used.

The invention claimed is:

1. A vehicle seat comprising:

a seat cushion frame configured to support a seat cushion;

a seat back comprising a support surface for supporting the back of a seated occupant;

a seat back frame configured to support the seat back;

a reclining mechanism including a curved bracket integrally mounted on the seat back frame, wherein the bracket is configured to move arcuately with respect to the seat cushion frame to thereby tilt the seat back rearwardly;

a lumbar support mechanism configured to push the support surface toward the occupant; and a controller configured to adjust operation of the lumbar support mechanism; wherein the controller includes a processor that performs information processing, and the processor is configured to cause the lumber support mechanism to push the support surface toward the occupant when the seat back is rearwardly tilted at a predetermined angle or more.

2. The vehicle seat according to claim 1, wherein the processor is configured to adjust a pushed position of the support surface based on an angle of tilt of the seat back.

3. The vehicle seat according to claim 1, wherein the reclining mechanism includes a curved rail attached to the seat cushion frame, and the bracket is configured to move while being guided by the curved rail, so as to swing with respect to the seat cushion frame.

4. The vehicle seat according to claim 2, wherein the reclining mechanism includes a curved rail attached to the seat cushion frame, and the bracket is configured to move while being guided by the curved rail, so as to swing with respect to the seat cushion frame.

5. The vehicle seat according to claim 3, wherein the curved rail is formed in the shape of a curve whose radius of curvature varies.

6. The vehicle seat according to claim 4, wherein the curved rail is formed in the shape of a curve whose radius of curvature varies.

* * * * *